Nov. 4, 1969     O. G. H. JUNGNER     3,476,518
AUTOMATIC PIPETTING DEVICE
Filed July 29, 1966     2 Sheets-Sheet 1
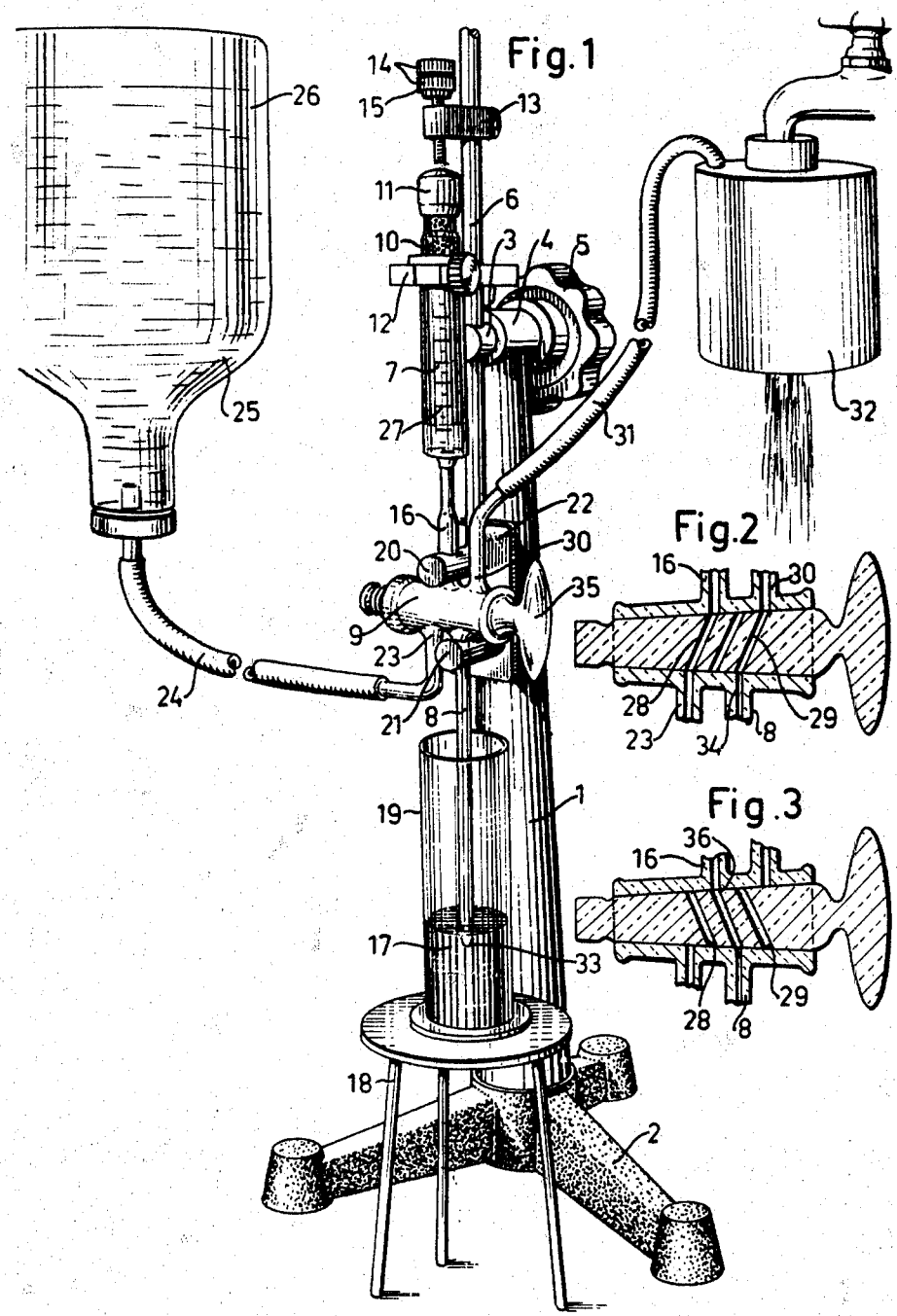

United States Patent Office 3,476,518
Patented Nov. 4, 1969

3,476,518
AUTOMATIC PIPETTING DEVICE
Olof Gunnar Hugo Jungner, Hovas, Sweden, assignor to AB Medicinsk-Kemiska Laboratoriet Calab, Vallingby, Sweden
Filed July 29, 1966, Ser. No. 568,795
Claims priority, application Sweden, Sept. 2, 1965, 11,479/65
Int. Cl. B01l 3/02
U.S. Cl. 23—259                    2 Claims

ABSTRACT OF THE DISCLOSURE

An automatic pipetting device used to mix a plurality of fluids of varying volumes including a number of volumetric systems connected to a common valving arrangement which connects the fluid volumes to measuring and storing vessels. The valving arrangement includes an intermediate sequentially indexible disc sandwiched between two outer discs, wherein the two outer discs have an equal number of fluid-carrying channels arranged concentrically about a central common axis and the intermediate disc having a plurality of channels for interconnecting the correspondingly located channels and adjacently located channels in the outer discs.

---

Figure 4:
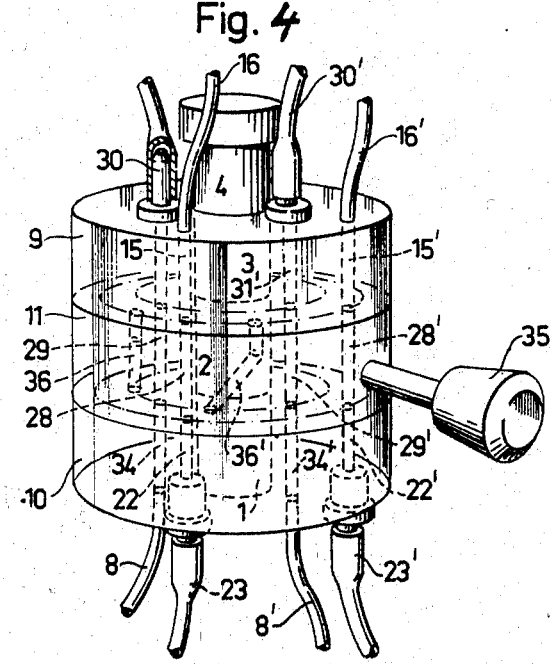

The present invention relates to an automatic pipetting device for mixing at least two fluid volumes of different sizes. In many physical, chemical and medical procedures it is required to mix two fluid quantities, the volumes of which are accurately measured. For this purpose several different types of pipetting devices have been used in order to simplify and facilitate the measuring of the fluid volumes. Some prior art pipetting devices have had the drawback that they comprise two entirely different and separately operable volumetric systems, which implies that when using said apparatus it was necessary to perform separately on each system all the operations required for filling and emptying, a time consuming and tiresome procedure which also can lead to errors. Furthermore, when one of the fluid volumes is very small, it is difficult to measure such a small fluid volume accurately and fairly rapidly.

In the mixing of two different fluids in definite proportions it has therefore been suggested to use two volumetric systems connected by a common stop-cock device, one system for measuring one of the volumes by means of an adjustable burette and the other for measuring the second volume by means of a constant measuring volume, namely one of the channels of the stop-cock device, said channels being arranged to be separated from each other when said device is in position for filling the volumetric systems.

Such a device can, however, not be used in practice when the available volume of fluid sample, such as a serum sample, which for instance has been obtained by tapping a patient, must be handled with great parsimony. Neither is it possible with a prior art device to attain the accuracy rates which are often desirable. Furthermore, in the prior art device the measuring range which can be covered by the measuring channel vessel in the cock is limited by the boundaries which are set for a channel diameter regarding the requirement as to laminar flow through said channel as well as by manufacturing difficulties.

The present invention has for its object to overcome said problems and relates to an automatic pipetting device intended for the mixture of at least two different liquids such as a reagent or dilutant present in a comparatively ample quantity and a fluid sample available only in a small quantity such as serum, in volumes of different sizes such as 1.5–25 ml. thymol reagent and 0.01–0.4 ml. serum sample, said apparatus comprising at least two volumetric systems connected by a common four-way stop-cock, one of the systems being provided for measuring one of the volumes by means of an adjustable measuring vessel and the other one for measuring the other volume by means of a constant measuring volume, the channels of the stop-cock device being arranged to be separated from each other when said device is in the position for filling the volumetric system. The invention is essentially characterized in that the volumetric system intended for measuring the largest volume, i.e., the dilutant present in ample quantity comprises a measuring vessel adjustable to a certain volume, said measuring vessel being connected to a storage vessel by the stop-cock device in a certain position, whereby the measuring vessel is automatically filled to the present volume, while the measuring system intended for measuring the smallest volume, i.e., the sample fluid, comprises a measuring vessel in form of a capillary tube suitably interchangeably connected to the stop-cock device, provision being made that in the above position of the stop-cock device said capillary tube can be filled by suction action out of e.g., a test tube under the supervision of the pipetting apparatus operator.

In another embodiment of the invention the stop-cock device is so connected to both volumetric systems that in one position of said device the fluid volume measured in the larger measuring vessel may flow out through the smaller measuring vessel so that the larger fluid volume thereby flushes out the smaller fluid volume simultaneously intermixing with said smaller volume.

By providing a suction device for filling the smaller volume liquid quantity and providing for the larger measuring volume to be filled by a pressurized fluid, for instance by or against the action of a biased plunger in the measuring vessel it is insured that the whole pipetting procedure, i.e., the filling of both measuring volumes as well as the tapping and mixing of the liquid can be achieved by two manipulations only, one for setting the stop-cock device in filling position and the other for setting said device in tapping position.

The filling of the larger measuring vessel can be achieved either by providing a storage container the liquid level of which is higher than the highest level in said measuring vessel or by using a storage vessel the liquid level of which being lower than the highest level in the large measuring vessel but in which the liquid is pressurized.

It is further suitable to position the larger measuring vessel above the measuring vessel for the smallest fluid volume so that the larger fluid quantity can in the simplest way flush out the smaller fluid quantity.

Both volumetric systems are preferably fitted on a common stand, the whole pipetting device being rotatably journalled about a horizontal axis on said stand.

In a specific modification of the invention provision is made for the possibility of carrying out simultaneously several analyses by having the four-way stop-cock device which connects both volumetric systems to consist of a multiple device comprising a plurality of four-way stop-cocks arranged for simultaneous and parallel operation, which can be simultaneously positioned in each one of three positions, i.e. filling position, emptying position and closed position.

According to an embodiment of this specific modification of the invention the multiple stop-cock device consists of preferably circular disks made of preferably a plastic material, e.g. a transparent material such as Teflon, stacked upon each other on an axle, the middle disk being rotatable relative the external disks. On each four-way cock the two upper orifices provided on the top disk are preferably connected to the suction device and to the larger measuring vessel, respectively, while the two lower orifices provided on the bottom disk are preferably connected to the smaller measuring vessel and to the reagent storage vessel, respectively.

Figure 5:
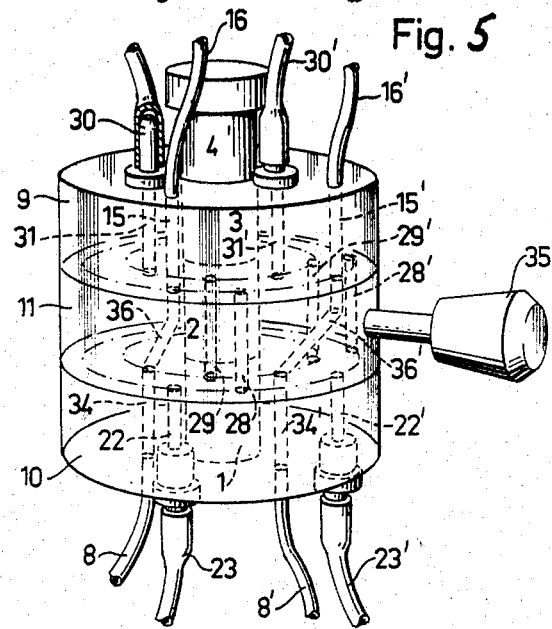

The invention will now be described more in detail, reference being made to the attached drawings in which FIGURE 1 shows an embodiment of the present invention in the form of a pipetting device mounted on a stand, FIGURES 2 and 3 are sections of the stop-cock device, FIGURE 4 shows a multiple four-way stop-cock device according to a specific modification of the invention in filling position, and FIGURE 5 shows the multiple four-way stop-cock device in emptying position.

In FIGURE 1 the stand of the device is designated by reference numeral 1. Said stand is assumed to rest on a tripod 2 and is at its upper end provided with a horizontal axle 3 journalled in a bearing bushing 4 on the stand 1 in which bushing the axle can be rotated by means of a knob 5. The knob 5 is provided with a locking screw concentric to the axle 3 whereby the axle 3 can be locked in any position in the bearing bushing 4.

On the axle 3 is secured a supporting member 6 for the pipetting device which essentially comprises a larger measuring vessel 7 and a smaller measuring vessel 8 as well as a stop-cock device 9 connected to both vessels.

In the embodiment shown the larger measuring vessel is assumed to be constituted by a graduated measuring cylinder 7 of, for instance, glass in which is arranged a movable plunger 10. In the embodiment shown said plunger is also made in form of a glass container and filled with buck shot. At its lower end the plunger is provided with plane surface and at its upper end it is closed by a metallic cover 11 for instance. The measuring cylinder 7 is so fastened by a clamping device 12 to the supporting member 6 that the axis of the cylinder 7 is parallel with the axis of the supporting member 6. On the supporting member 6 above the plunger 10 of the measuring cylinder 7 is arranged a stop 13 which is provided with a micrometric screw 14 by means of which the position of the plunger 10 controlling the measuring volume can be accurately set. The micrometric screw is provided with a lock nut 15 by means of which the measuring volume once set can be fixed and thereby made reproducible.

At its bottom the measuring cylinder 7 is provided with an opening connected over a tube 16 with one of the outlets of the stop-cock device 9 arranged as a four-way stop-cock.

Another outlet of the four-way stop-cock provided obliquely below the said outlet is connected to a measuring cylinder 8 which constitutes the smaller measuring vessel. In the embodiment shown said measuring cylinder is constituted by a capillary tube. On the drawing said capillary tube is shown dipped into a fluid 17 contained in a test tube 19 placed on a tripod 18.

The tube 16 and the capillary tube 8 are secured to a plate 22 on the supporting member 6 by means of brackets 20 and 21 respectively. Thus a reliable mechanical assembly is provided between the larger and the smaller measuring vessel as well as with the four-way stop-cock device 9, all of which parts are supported and protected by the supporting member 6 and the plate 22 as well as the clamp 12 and the brackets 20 and 21. The supporting member 6 and the plate 22 are preferably made of metal while the clamp and the brackets can be of plastic material. In providing the openings for the tubes 16 and 8 in the brackets 20 and 21 with a certain clearance, the stop-cock device 9 is given a certain mobility respective the supporting member 6 and the plate 22 so that a difference in the coefficient of linear expansion between the material of the supporting member 6 and that of both volumetric systems does not result in internal stresses in the latter material.

FIGURES 2 and 3 show sections of the four-way stop-cock 9 in two different positions. The position shown in FIGURE 2 is assumed to correspond with the position of the stop-cock device shown in FIGURE 1. In this position the tube 16 from the measuring cylinder 7 is connected with an outlet 23 located straight ahead on the four-way stop-cock, said outlet 23 being connected via a rubber hose 24 with a storage vessel 25 in which the fluid level 26 is higher than the level 27 at which the measuring cylinder 7 is intended to be filled. From the storage vessel the fluid can thus be filled into the measuring cylinder 7 via the four-way stop-cock 28, the plunger 10 being pushed upward against the micrometric screw 14. In case a more viscous liquid is to be filled in the measuring cylinder 7, the filling process can be speeded up by subjecting the plunger to an upwardly directed tensile force, for instance, by means of a spring or an elastic string. The volume of the measuring cylinder 7 can, for instance, be of the order of magnitude of 1–25 ml.

At the same time as the measuring cylinder 7 is thus filled from the storage vessel 25 it is also possible to fill the measuring cylinder 8 since the four-way stop-cock in said position, as appears from FIGURE 2, connects the measuring cylinder 8 via a channel 29 with an outlet 30 on the four-way stop-cock, said outlet 30 being connected via a rubber hose 31 to a water jet injector 32. In this embodiment the measuring cylinder 8 is assumed to consist of a capillary tube the volume of which between its lower end 33 and the inlet 34 of the channel 29 is exactly known and of the order of magnitude of 0.010 ml. to 0.04 ml.

In series of consecutive measurements, as appears from the above description, only one manipulation is required for operating the pipetting device for achieving its filling, i.e. the setting of the stop-cock knob 35.

Prior to the emptying of both measuring vessels the test tube 19 is first removed whereupon it is replaced by a test tube in which both liquids are to be mixed. The knob 35 is thereafter rotated by 180° so that the stop-cock reaches the position shown in FIGURE 3. In this position the stop-cock channels 28' and 19 are passive and the outlets 23 and 30 are shut off while the tube 16 and the measuring cylinder 8 are connected via the stop-cock channel 36. The fluid container and the measuring cylinder 7 can thus flow by gravity and, due to the pressure exerted by the plunger 10, flow out through the capillary tube of the measuring cylinder 8 at the same time as it intermixes with the fluid contained in said capillary tube and flushes the walls of the capillary tube.

In order to avoid drop formation at the lower end of the measuring cylinder 8 said end is pointed. Due to the small volumes of fluid measured in the capillary tube— which may be comprised between 0.010 and 0.4 ml.— such a drop formation would possibly imply a distortion of the measuring result.

The multiple four-way stop-cock device shown in FIGURES 4 and 5 is assumed to be connected with two symmetric systems in the same way as the stop-cock device 9, 35 is connected to both volumetric systems shown in FIGURE 1. For the sake of clarity the same parts are designated by the same reference numerals as in FIGURES 1–3. The stop-cock device 9, 35 in said figures with the outlet 23, 16 and 8, 30 thus correspond in FIGURES 4 and 5 to the stop-cock device 9, 35 with the outlets 23, 16 and 8, 30. Said four-way stop-cock device is, however, provided recurrently along the periphery of the circular disks 9, 10, 11 although only one further such four-way stop-cock device with the outlet 23', 16' and 8', 30' has been shown on the drawing for the sake of clarity.

In this embodiment the outlets 23, 23' etc. are all assumed to be connected in parallel to a reagent storage vessel like the storage vessel 25 shown in FIGURE 1. The outlet 16, 16' etc. can also be connected in parallel to a common measuring vessel like the measuring vessel 7 in FIGURE 1 and adjustable for a determined larger volume. Said measuring vessel must then, however, be adjusted to a volume which is so many times larger than the volume required for similar analysis as there are four-way stop-cock devices used along the periphery of the multiple four-way stop-cock device of this embodiment.

The outlets 33, 33' etc. can likewise be connected to a common suction device. The outlets 8, 8' etc. are then connected to each its individual measuring vessel for the smaller measuring volume.

The multiple four-way stop-cock device of this embodiment consists of three disks 9, 10, 11 arranged on top of each other on a common axle, said disks being preferably transparent and made of Teflon. Said disks are preferably circular and both outer disks 9 and 10 are secured to the axle parts 1 and 3 while the middle disk 11 is rotatably journalled on a bearing bushing 2 on the axle 2 and thus displaceable relative both outer disks. Along the periphery of both outer disks the above named outlets are provided in pairs on two concentric circles, i.e. the outlet 30, 30' etc. on an inner concentric circle on the upper disk 9 and the outlet 16, 16' etc. on an outer concentric circle on the same disk while the outlets 8, 8' etc. are on an inner concentric circle on the lower disk 10 and the outlets 23, 23' etc. on an outer concentric circle on the lower disk 10.

All of said outlets open into axial channels extending all through the actual disks, said channels being on their sliding surface adjacent the middle disk provided with sealing rings surrounding the channels, preferably in form of O-rings. In the upper disk the channels 31 and 31' thus correspond to the outlets 30 and 30' and the channels 15 and 15' correspond to the outlets 16 and 16' etc. In the lower disk the channels 34 and 34' etc. correspond to the outlets 8, 8' etc. and the channels 22, 22' etc. correspond to the outlets 23, 23' etc.

The middle disk is also provided with axial channels. In a position corresponding to the filling position of the stop-cock device two axial channels 29 and 28, 29' and 28' etc. will register with the channels 31 and 34, 31' and 34' etc. as well as with the channels 15 and 22, 15' and 22' etc. respectively. In its other position, namely the emptying position, the middle disk is provided with an oblique channel 36, 36' etc. between an upper orifice corresponding to the orifices of the channels 15, 15' etc. and a lower orifice corresponding to the channels 34, 34' etc. In the emptying position said oblique channels will thus connect the outlet 16 with the outlet 8 and allow the smaller measuring fluid volume to be flushed out by the larger measuring fluid volume flowing from the container connected to the outlet 16.

For setting the middle disk in its different positions an operating arm 35 is provided which allows an easy setting of the multiple four-way stop-cock device in its three different positions.

Optionally a fourth position with two outlets intended for an extra flushing of the stop-cock device channel can be provided between the different four-way outlet.

If desired, the middle disk can also be provided with a gear rim which can be driven by a programmed motor.

A couple of practical application examples of the invention are given below.

In hospitals a generally utilized reagent test is the so-called thymol tests, the object of which is to prepare a fluid mixture, the turbidity of which can be determined in a photometer.

The performance of this test using the pipetting device according to FIGURES 1–3 is carried out as follows.

A quantity of thymol reagent sufficient for a whole series of said tests is contained in the storage vessel 25 while the various serum samples are set up within easy reach in a number of test tubes. The water jet injector 32 is put into operation. For each test to be carried out the actual test tube is then so placed under the vessel 8 that the point 33 of the latter dips into the serum. The size of said vessel is so adjusted that its measuring volume amounts to 0.05 ml. The stop of the larger measuring cylinder 7 is so adjusted that the measuring cylinder 7 can accommodate 3.0 ml. thymol reagent when the plunger 10 is in its upper position.

After that the above named test tube has been lifted up around the measuring cylinder 8, so that the point of the latter dips into the serum, the stop-cock 9 is set in the position shown in FIGURE 2. The measuring cylinder 8 is then filled with 0.05 ml. serum and the measuring cylinder 7 with 3.0 ml. thymol reagent. The stop-cock 9 is thereafter set in the position shown in FIGURE 3 and due to the weight of the plunger 10 the thymol reagent flows through the measuring vessel 8 while simultaneously flushing said vessel and mixing with the serum. The turbidity of the fluid mixture thus obtained is thereafter determined in a photometer as known in prior art.

Another application example of the invention is in analysis work in which a first procedure stage requires the dilution of a serum with a diluant, for instance in the ratio 1:50 or 1:100. Such a dilution occurs in the same way as described above in connection with the thymol test.

There are further analysis procedures in which the invention can be used in two or more stages of the analysis.

The above examples are chosen at random among a number of possible fields of application in the clinical-chemical working technique. Other examples could also be given which are related to a number of fields of applications in the purely chemical or purely physical laboratory work. The invention is thus not restricted to the embodiments described and shown on the drawings and many alterations and modifications may be made within the scope of the appending claims.

What I claim is:

1. An automatic medical fluid pipetting apparatus suitable for mixing of at least two different fluids, comprising three cylindrical blocks disposed adjacent to one another on a common central axis, the outer blocks each having an equal number of equally spaced apart parallel channels extending therethrough parallel to said axis and disposed in at least one circle concentric to said axis, connecting means for connecting said channels to fluids, the intermediate block having a corresponding number of channels extending therethrough, a plurality of said intermediate channels being parallel to said axis and aligned with said channels in said outer blocks, the remaining of said channels being oblique to the channels in the outer block so that each intermediate channel is able to connect a channel in one outer block with an adjacent channel in the other outer block, said intermediate block being disposed in sealed relation to said outer blocks and being rotatable about said axis relative to said outer blocks, each orifice of said channels of said intermediate block being sequentially aligned with each of said channels in said outer blocks to enable the channels of one outer block to be alternately connected to the corresponding channel of the other outer block or an adjacent channel in said block in order to sequentially connect the channels in said other outer block to the fluids, and means for sequentially indexing said intermediate block about said axis in a step-by-step manner.

2. A fluid pipetting apparatus as claimed in claim 1, in which the orifices of the channels in the outer blocks are surrounded by O-rings countersunk in said surfaces in order to achieve sealing.

References Cited

UNITED STATES PATENTS

| 2,889,852 | 6/1959 | Dunlap | 137—625.19 |
| 3,012,863 | 12/1961 | Feichtmeir | 23—253 |
| 3,171,722 | 3/1965 | Natelson | 23—259 XR |
| 3,184,122 | 5/1965 | Nerenberg | 23—259 XR |
| 3,192,969 | 7/1965 | Baruch et al. | 23—259 XR |
| 3,197,285 | 7/1965 | Rosen | 23—253 |
| 3,222,135 | 12/1965 | Ashmead | 23—259 XR |

MORRIS O. WOLK, Primary Examiner

R. E. SERWIN, Assistant Examiner

U.S. Cl. X.R.

23—253, 292; 73—425.4; 137—625.19